(12) United States Patent
Sloane et al.

(10) Patent No.: US 6,665,943 B1
(45) Date of Patent: Dec. 23, 2003

(54) SUBSTANTIALLY CIRCULAR BLADE HEDGE TRIMMER

(76) Inventors: Bart P. Sloane, 611 Kromer Ave., Berwyn, PA (US) 19312; Thomas Carson Sloane, 1031 Media Lane Rd., Newtown Square, PA (US) 19073

( * ) Notice: Subject to any disclaimer, the term of this patent is extended or adjusted under 35 U.S.C. 154(b) by 0 days.

(21) Appl. No.: 10/105,819

(22) Filed: Mar. 25, 2002

Related U.S. Application Data

(60) Provisional application No. 60/357,478, filed on Feb. 15, 2002.

(51) Int. Cl.[7] .......................... B26B 15/00; A01G 3/047
(52) U.S. Cl. .............................. 30/276; 30/206; 30/264
(58) Field of Search ........................ 30/205, 206, 233, 30/233.5, 263, 264, 276

(56) References Cited

U.S. PATENT DOCUMENTS

| | | | | |
|---|---|---|---|---|
| 2,091,827 A | * | 8/1937 | Mercatoris | 30/276 |
| 2,645,010 A | * | 7/1953 | Holmes | 30/206 |
| 2,883,746 A | * | 4/1959 | Gilsi | 30/276 |
| 3,050,854 A | | 8/1962 | Becker et al. | 30/276 |
| 4,049,059 A | | 9/1977 | Weibling | 172/15 |
| 4,601,103 A | | 7/1986 | Sugiyama | 30/162 |
| 4,631,826 A | * | 12/1986 | Parke | 30/276 |
| 4,641,431 A | | 2/1987 | Leming et al. | 30/276 |
| 4,672,744 A | | 6/1987 | Jackson et al. | 30/276 |
| 4,715,123 A | | 12/1987 | John et al. | 30/276 |
| 4,760,646 A | | 8/1988 | Siegler | 30/382 |
| 5,239,755 A | * | 8/1993 | Kramer | 30/264 |
| D389,715 S | | 1/1998 | Dustin et al. | D8/70 |
| 5,974,674 A | * | 11/1999 | Kelly | 30/276 |

* cited by examiner

Primary Examiner—Hwei-Siu Payer
(74) Attorney, Agent, or Firm—Michael F. Petock, Esq.

(57) ABSTRACT

A hedge trimmer is provided with a substantially circular housing and a substantially circular blade having a plurality of cutting elements thereon. The substantially circular blade is mounted within the substantially circular housing and adapted to rotate. A handle projects from the housing. A motor for rotating the circular blade is mounted in the handle. The substantially circular housing is provided with a plurality of digits between which hedge may be received wherein the cutting elements on the rotating circular blade may cut the hedge. The cutting elements on the circular blade may be substantially U-shaped elements equally spaced about the periphery of the substantially circular blade. A plurality of digits may be formed in a circular housing on each side of the handle.

33 Claims, 7 Drawing Sheets

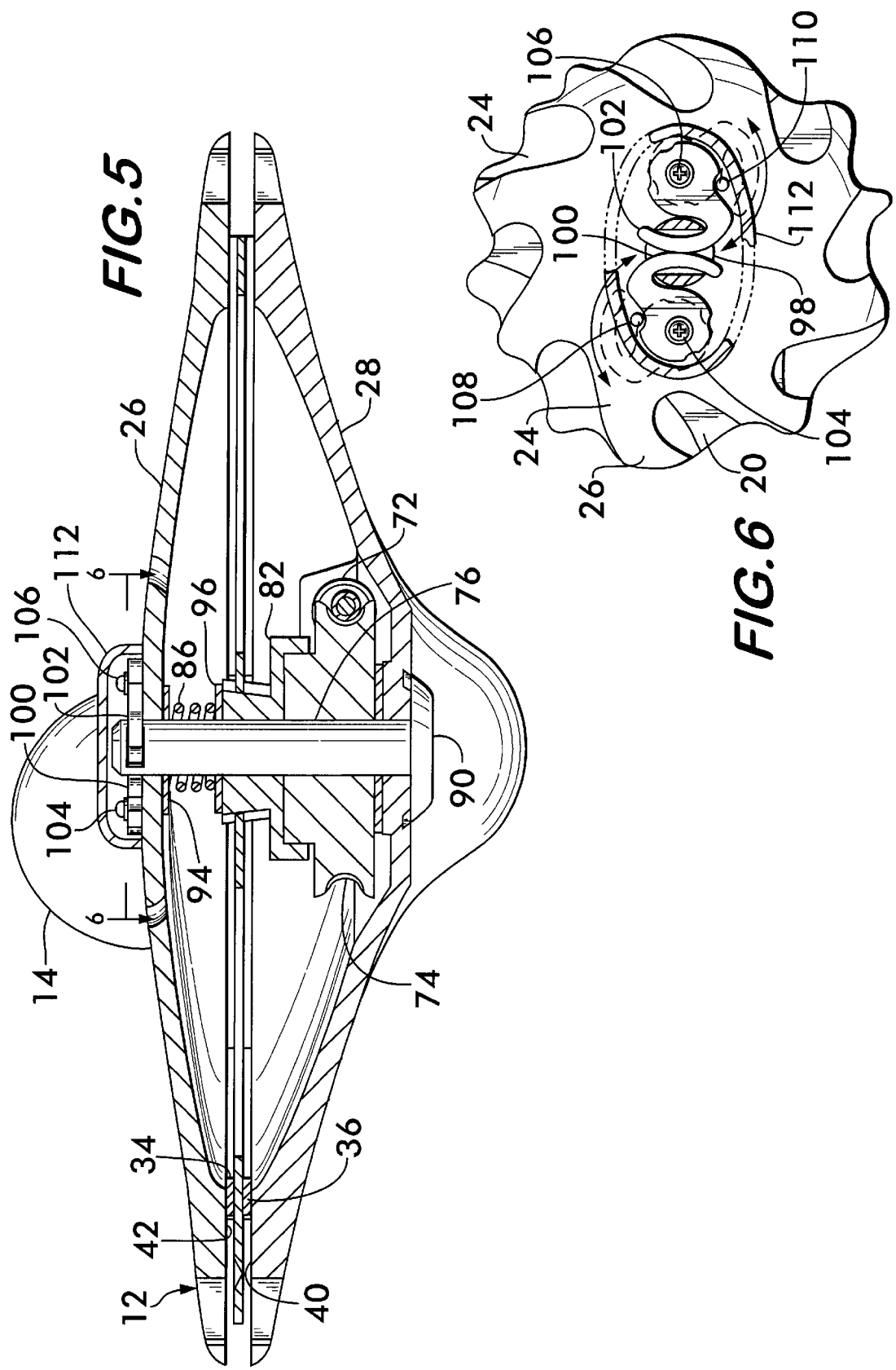

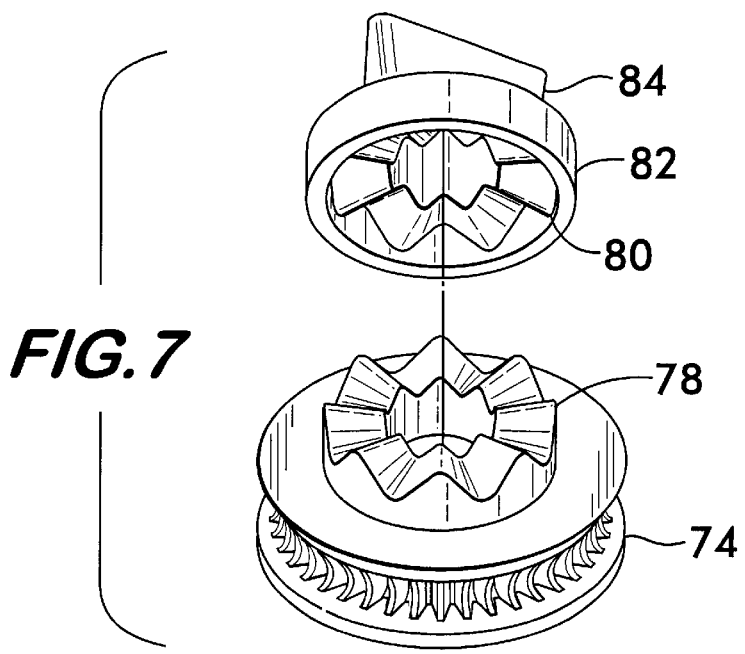
FIG. 7
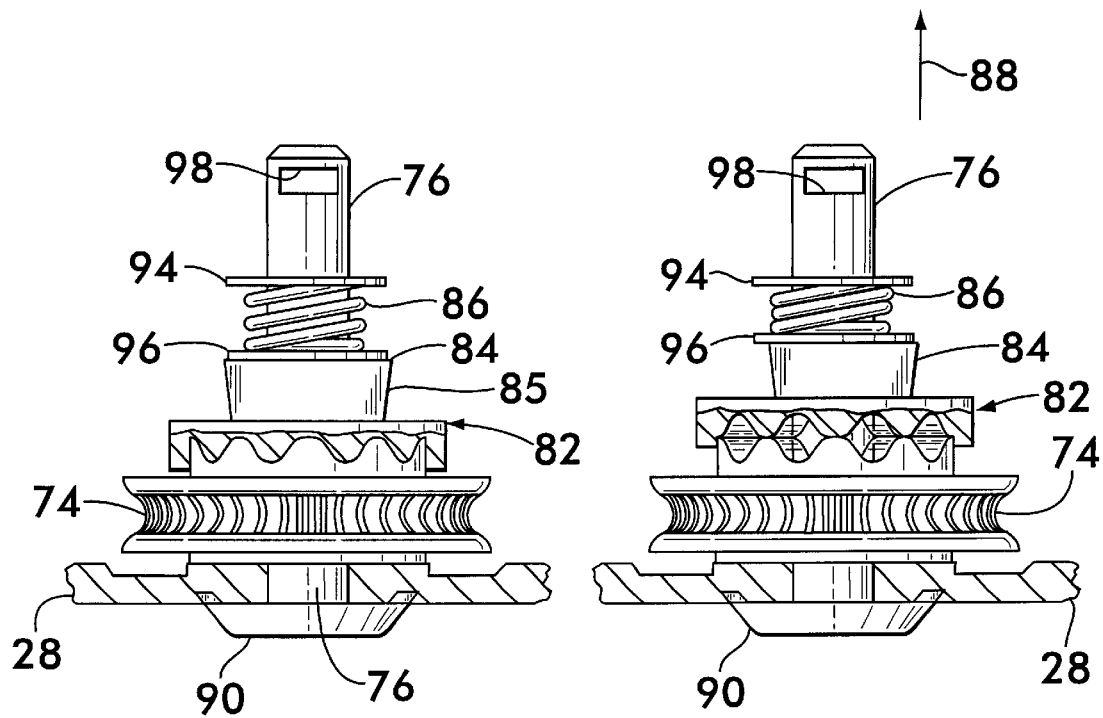
FIG. 8   FIG. 9

SUBSTANTIALLY CIRCULAR BLADE HEDGE TRIMMER

CROSS REFERENCE TO RELATED APPLICATION

This application claims the benefit of U.S. Provisional Application No. 60/357,478, filed Feb. 15, 2002 entitled "Substantially Circular Blade Hedge Trimmer."

FIELD OF THE INVENTION

The present invention is directed to a trimmer for cutting hedges and similar plants. More particularly, the present invention is directed to a hedge trimmer with a rotating substantially circular blade mounted in a substantially circular housing.

BACKGROUND OF THE INVENTION

Trimmers for cutting hedges, bushes and other ornamental plants and shrubs are in wide use today. The most popular version of the hedge trimmer today uses an elongated reciprocating cutting element driven by a motor. This arrangement tends to be somewhat unwieldy and dangerous.

Additionally, there has been some effort to produce a hedge trimmer having a substantially circular housing. For example, see U.S. Pat. No. 3,050,854—Becker et al. which discloses a hedge trimmer which utilizes a rotating elongated blade within a circular housing. More recently, U.S. Pat. No. 4,641,431—Leming et al. discloses a hedge trimmer which utilizes a metal wire whip which is rotated at very high speed within a circular housing for trimming hedges.

SUMMARY OF THE INVENTION

An advantage of the present invention is that it provides a lighter-weight apparatus.

Another advantage of the present invention is that it operates more quietly than a reciprocating hedge trimmer.

Another advantage of the present invention is that it provides increased safety by preventing or making it more difficult for a person to get a body part, such as a finger or hand, in contact with the cutting blade.

Another advantage of the present invention is that it provides a more balanced hedge trimmer.

Another advantage of the present invention is that it provides a smoothly operating substantially circular blade.

Another advantage of the present invention is that by providing a substantially circular blade, the cutting elements may be moved at a faster rate than if the cutting elements were on a reciprocating blade.

Another advantage of the present invention is that it is adapted to cut when moved in the natural direction of the tool being swung by an arm of a user.

Another advantage of the present invention is that it provides a relatively compact hedge trimmer.

Another advantage of the present invention is that it provides a release mechanism to prevent damage in the event that the blade is stalled when the motor is operating.

Another advantage of the present invention is that it provides airflow out of the housing to remove debris.

Another advantage of the present invention is that the blade is substantially completely enclosed within the housing.

Another advantage of the present invention is that it provides simple tool-less removal of the blade for sharpening, replacement or the like.

Another advantage of the present invention is that it provides a safe and secure housing latching means which still allows the housing to be easily opened.

Briefly and basically, in accordance with the present invention, a lightweight, quiet and safe apparatus for trimming hedge and the like is provided. The use of the term hedge throughout is meant to include all types of hedge, bushes and other ornamental plants and shrubs that usually produce new growth which may be trimmed by what is commonly referred to as a hedge trimmer.

In accordance with the present invention, a substantially circular housing is provided with a handle projecting from the housing. A substantially planar circular blade having a plurality of cutting elements thereon is mounted within the substantially circular housing and adapted to rotate. A motor is provided for rotating the circular blade. The substantially circular housing is provided with a plurality of digits or guides between which hedge may be received wherein the cutting elements on the rotating circular blade may cut the hedge.

Throughout, substantially circular blade means not only a circular blade with cutting elements extending from the periphery of the circle, but various arrangements of a closed structure for the blade including an equilateral triangle and various other multi-sided figures including square, hexagon, octagon and the like. Further, although an open structure comprised of radial members interconnected in the vicinity of the periphery is presently preferred, it is understood that a solid disc shaped blade may be utilized within the spirit of the present invention. However, the presently preferred embodiment has a substantially circular peripheral configuration with cutting elements extending from the periphery thereof.

In a presently preferred embodiment, the handle projects substantially in a radial direction with respect to the circular housing with the motor for rotating the circular blade being mounted in a distal or far end of the handle, thereby providing balance between the circular housing with the cutting blade on one end and the motor at the other end. Additionally, in a presently preferred embodiment, the handle, for ergonomic reasons, is formed to slope upwardly at a small angle. However, it is understood that the invention may be practiced without such sloping.

In a presently preferred embodiment, the substantially circular cutting blade has three cutting elements mounted equally distant around the periphery of the substantially circular blade, but it is understood that more or less cutting elements may be utilized. In a presently preferred embodiment, the cutting elements are generally U-shaped. The sharp portion of the U-shaped blade is in the direction of rotation of the circumference of the blade.

In a presently preferred embodiment, the digits are shaped and arranged such that the space between the digits is such that it prevents contact of body parts with the cutting elements of the circular blade.

In a presently preferred embodiment of the invention, the substantially circular cutting blade is provided with low-friction pads mounted to the blade with the pads riding against an upper and lower portion of the circular housing. In a presently preferred embodiment, the pads are elongated and arranged to create a fan action for blowing air outwardly from the substantially circular housing as the blade rotates.

Various arrangements of the cutting blade with respect to the drive shaft may be utilized. In one embodiment, the drive shaft comes in below the cutting blade. In a presently preferred embodiment, the drive shaft would come in above the cutting blade, placing the cutting blade closer to the lower edge of the substantially circular housing. This provides the advantage of the cutting element and the cutting occurring closer to the bottom edge of the housing.

In a presently preferred embodiment, a release mechanism is provided for releasing the substantially circular blade from the motor to prevent damage should the blade be stopped when the motor is operating. In a presently preferred embodiment, the blade is driven through a clutch. The clutch may be in the form of a pair of rounded interdigitated gears or teeth held in engagement by a resilient force whereby the gears or teeth may disengage by compressing the resilient force when the blade is stopped. Other forms of release mechanisms or clutches may be used in practicing the present invention.

In a presently preferred embodiment, a latch means is provided which securely retains the upper portion and the lower portion of the housing together, along with the blade sandwiched therein, but allows for tool-less ease of disassembly for sharpening, replacement of the blade or the like.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 5 is a cross sectional view taken along line 5—5 of FIG. 4.

FIG. 6 is a broken away cross sectional view of a portion of the upper housing, taken along line 6—6 of FIG. 5, illustrating the latching means for the housing.

FIG. 7 is an exploded view in perspective of a portion of the structure which provides a release mechanism for the blade to prevent damage should the blade suddenly be stalled.

FIG. 8 is an elevation view of the blade safety release structure with the blade drive being engaged to motor.

FIG. 9 is an elevation view of the blade safety release structure illustrating the release mechanism being activated to decouple the blade from the motor.

DETAILED DESCRIPTION OF THE PREFERRED EMBODIMENTS

Figure 1:
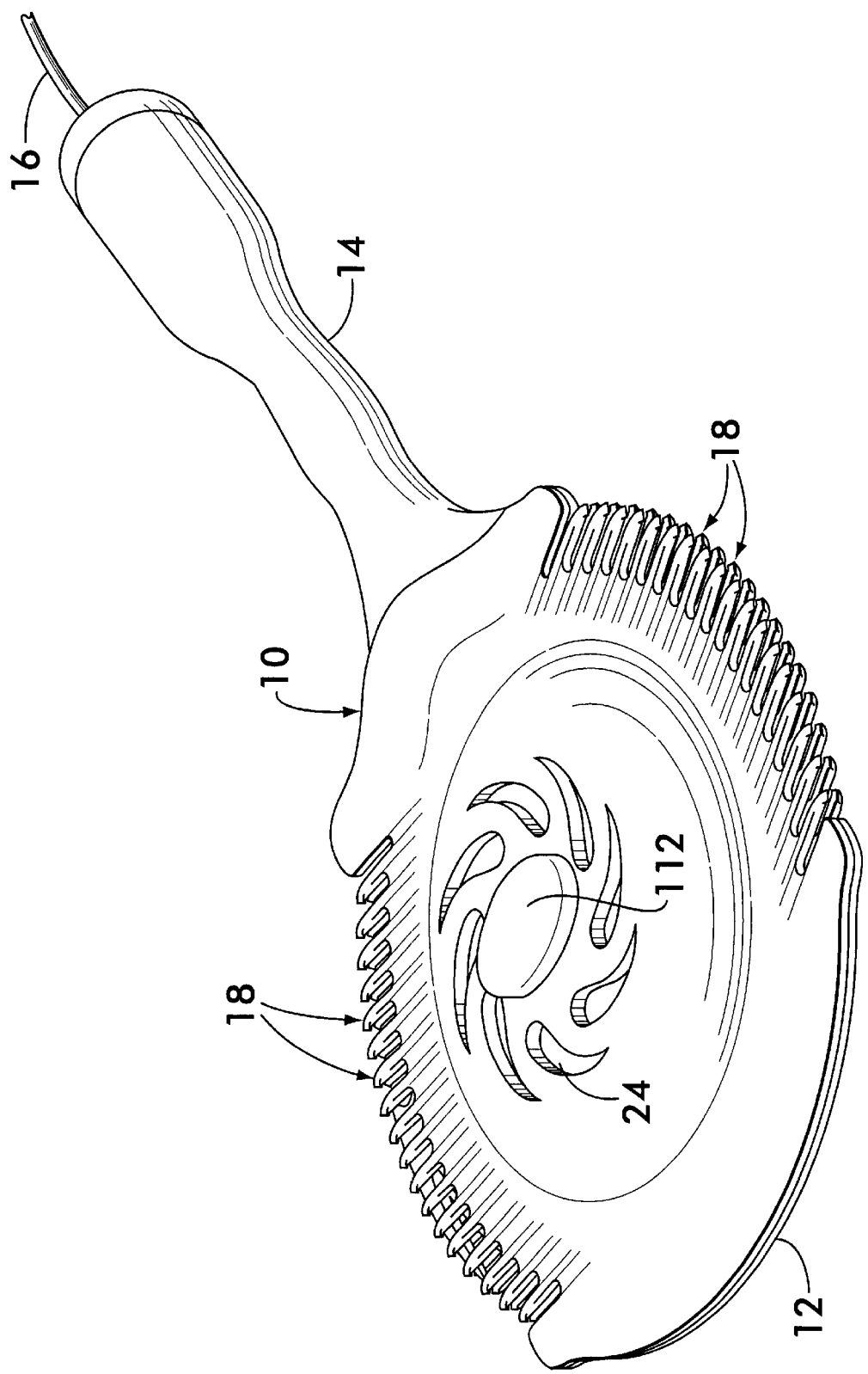
FIG. 1 is a view in perspective of a substantially circular hedge trimmer in accordance with the present invention.

Referring now to the drawings wherein like numerals indicate like elements, there is shown in FIG. 1 a hedge trimmer 10 having a substantially circular housing 12 with a handle 14 projecting therefrom. As discussed above, hedge is defined to include any type of plant life from which growth may be trimmed.

The substantially circular housing 12 and handle 14 may be constructed of any suitable rigid material, preferably a synthetic plastic material of relatively light weight, but it is understood that any other suitable rigid material including metal may be utilized. Hedge trimmer 10 is provided with a power cord 16. A power cord is not necessary if hedge trimmer 10 is provided with batteries or a rechargeable battery, but in order to minimize the weight of the trimmer, it is presently preferred that it would be provided with a power cord 16.

Referring now to FIGS. 1 through 9, substantially circular housing 12 is provided with a plurality of digits or guides 18 between which hedge may be received for cutting. Preferably, the spacing between the digits in which the hedge is received is designed to be such that body parts such as hands and fingers would not be able to enter. In a presently preferred embodiment, the plurality of digits 18 are spaced to provide approximately a ¼ inch opening between the digits. Each digit may have a width of approximately ⅛th of an inch. However, it is understood that various other dimensions may be utilized in practicing the present invention. Furthermore, if safety is not a desired factor, the spacing between the digits may be substantially larger than ¼ of an inch.

Figure 3:
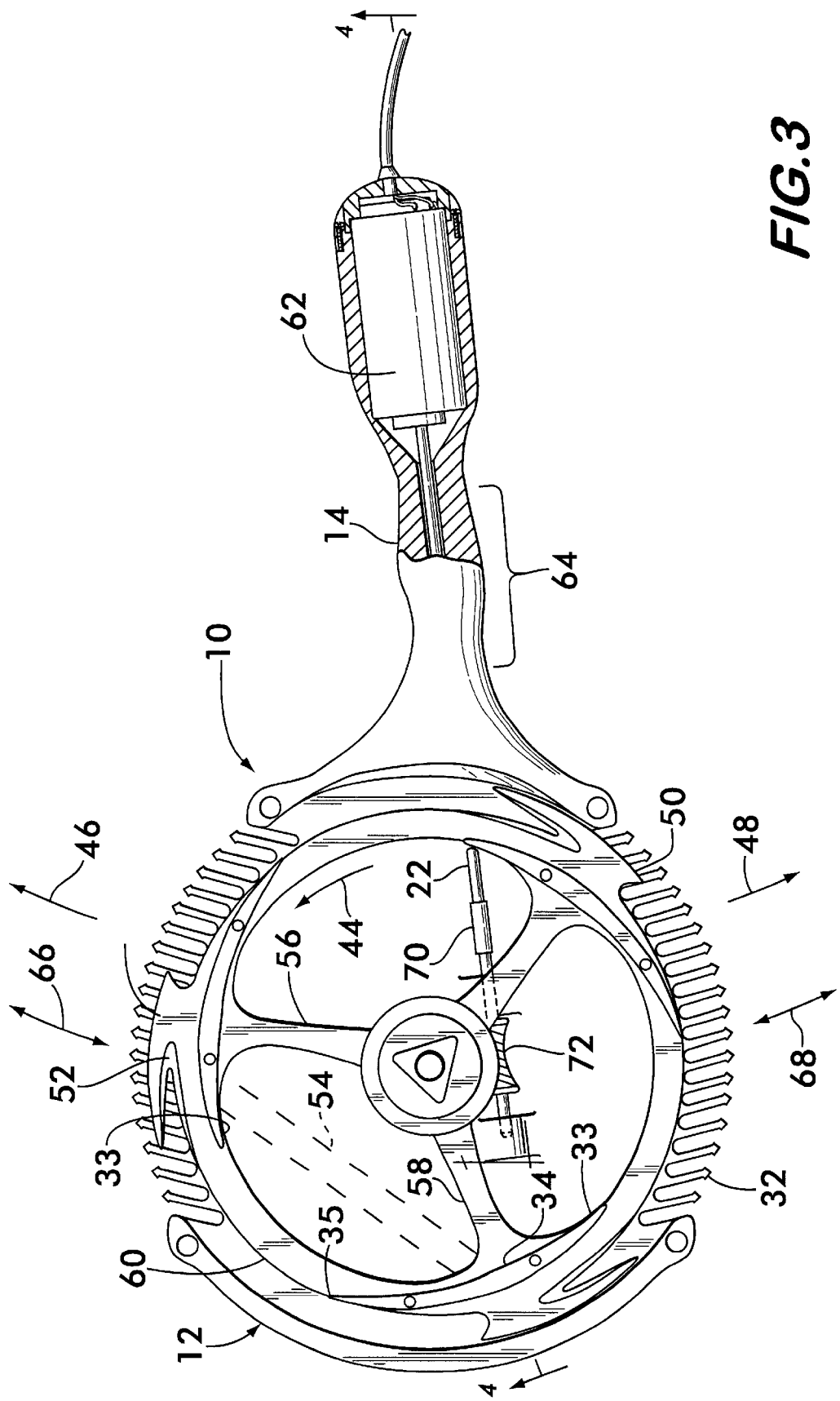
FIG. 3 is a plan view, partially broken away, of the circular hedge trimmer partially broken away to show the motor and with the upper portion of the housing removed to expose the blade.
Figure 4:
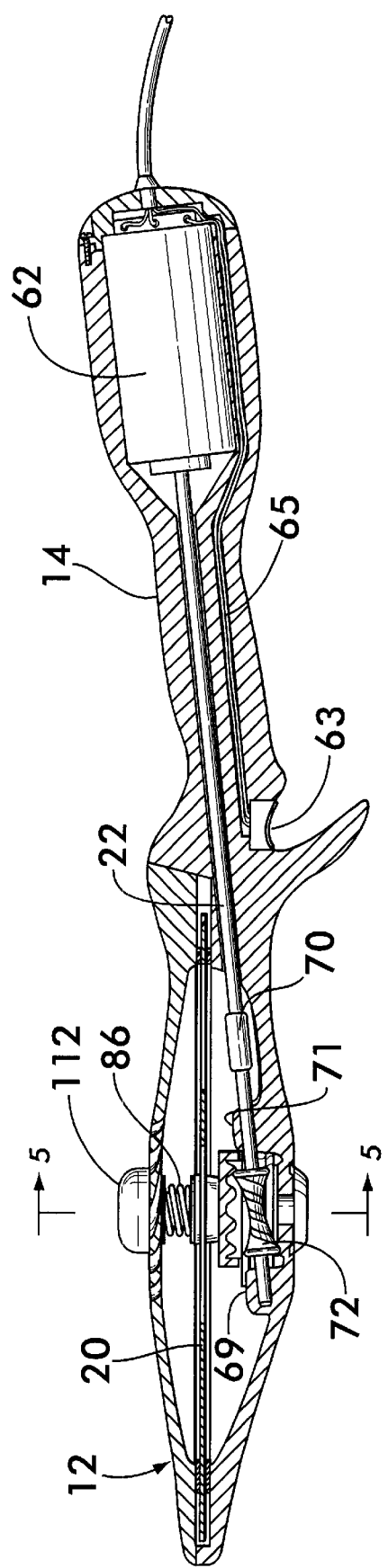
FIG. 4 is a cross sectional view taken along line 4—4 of FIG. 3.

As may be best seen in FIGS. 1, 3 and 4, handle 14 projects from substantially circular housing 12, and projects substantially in a radial direction with respect to substantially circular housing 12. Further, as may be best seen in FIG. 4, handle 14 preferably projects in a radial direction and is offset from the plane of substantially circular housing 12 by approximately 6 degrees, sloping upwardly by about 6 degrees as seen in FIG. 4. This may be best seen in FIG. 4 by the angle formed between substantially circular blade 20 and the angle of drive shaft 22 in handle 14. Although approximately 6 degrees is presently preferred, approximately indicating at least several degrees above and below 6 degrees, it is understood that various other angles or no angle may be utilized in practicing the present invention. In other words, the handle could be sloped upwardly by as much as 15 degrees or there could be no slope on the handle at all, the handle being aligned in or parallel to the plane of the blade. However, as stated, ergonomically, the presently preferred embodiment would have a handle slanting upwardly at about 6 degrees from the plane of the blade and three to eight degrees would be a preferred range. Further, although it is presently preferred that the substantially circular housing and the handle be integrally formed, such as by being molded out of a synthetic lightweight plastic material, it is understood that the handle may be separately formed and attached to the circular housing in either a permanent manner or in a removable manner. This may be attached by various suitable means including bolting, interlocking components on the substantially circular housing and the handle, a strong adhesive or any other suitable means of attachment. Accordingly, in all embodiments, the handle may be integrally formed or may be removably or permanently attached to the substantially circular housing.

Figure 2:
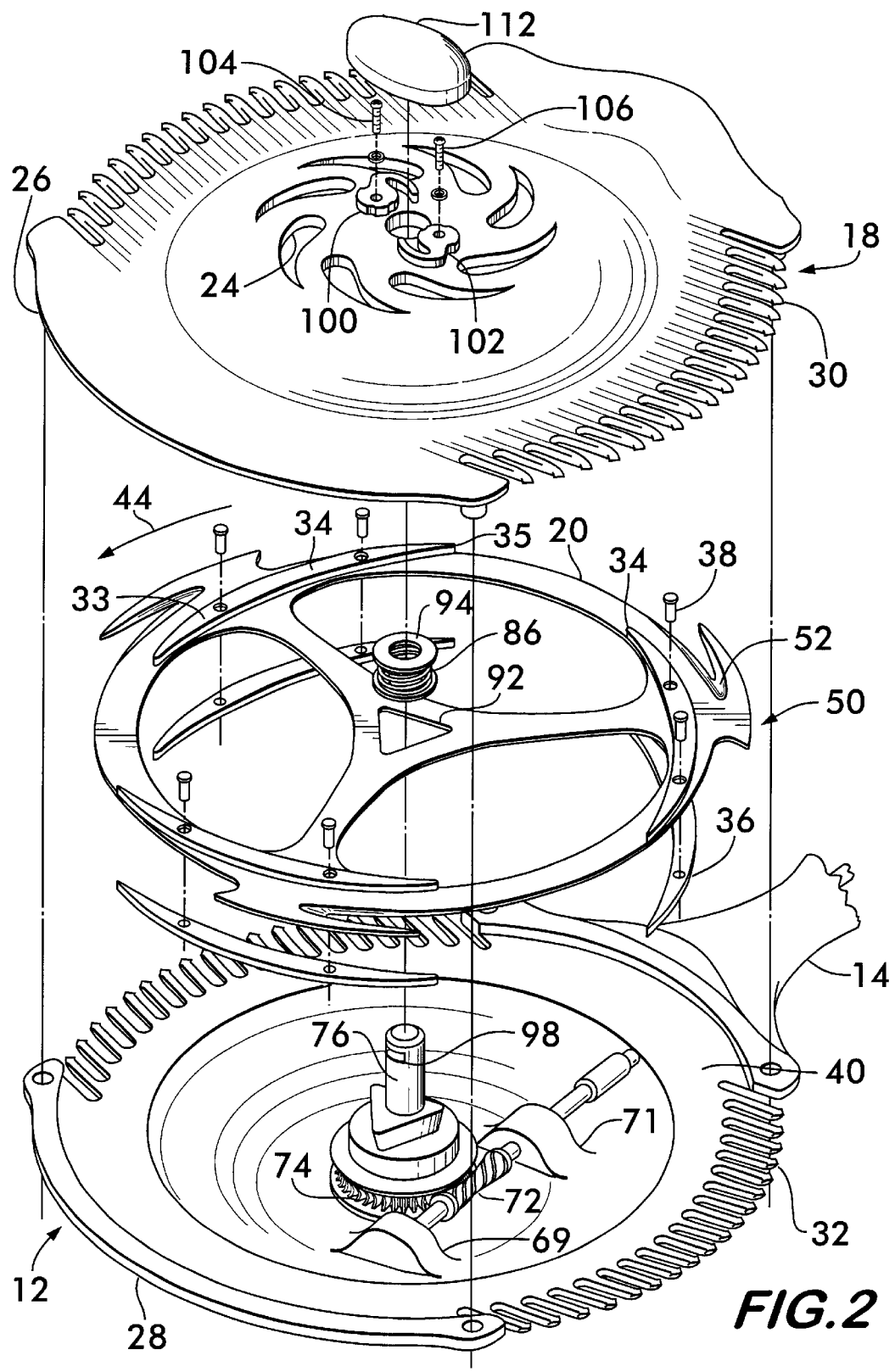
FIG. 2 is an exploded view in perspective of the circular housing portion of the hedge trimmer of FIG. 1 illustrating various components including the housing latch means, the blade, blade release structure and blade drive structure.

As may be best seen in FIGS. 1 and 2, substantially circular housing 12 is provided with air input ports 24. Air input ports 24 may be provided in upper portion 26 of substantially circular housing 12, as presently preferred, or they may be located in the lower portion 28 of substantially circular housing 12. As will be described more fully hereinafter, air input ports 24 are utilized as an air intake to provide a fan action outwardly in the area of digits 18. As may be best seen in FIG. 2, digits 18 are comprised of digits 30 on upper portion 26 of substantially circular housing 12 and digits 32 located on lower portion 28 of substantially circular housing 12.

As may be best seen in FIGS. 2 through 5, substantially circular planar blade 20 is mounted within substantially circular housing 12. Substantially circular blade 20 is mounted and adapted to rotate between upper portion 26 and lower portion 28 of substantially circular housing 12. Blade 20 is preferably substantially in a single plane or in the form of a disk of relatively light weight. Substantially circular blade 20 is provided with upper low-friction pads 34 and lower low-friction pads 36. These low-friction pads 34 and 36 may be made of nylon, teflon or any other suitable low-friction material. These pads may be secured by fasteners such as rivets 38 or they may be adhesively bonded to substantially circular blade 20. Within the spirit of the present invention, various numbers of pads may be utilized. However, in a presently preferred embodiment, three sets of upper and lower pads would be utilized.

Upper pads 34 and lower pads 36 ride against upper portion 26 of the circular housing and lower portion 28 of the circular housing, respectively. A bearing surface for the pads is provided on upper portion 26 and lower portion 28 of the circular housing. As may be best seen in FIG. 2, the bearing surface 40 on lower portion 28 of circular housing 12 provides the bearing surface for lower pads 36. A similar bearing surface 42 is provided on upper portion 26 of the circular housing. This may be seen in FIGS. 4 and 5. Referring to FIG. 5, lower low-friction pad 36 is seen riding on bearing surface 40 and upper low-friction pad 34 is seen riding on upper bearing surface 42.

As may be best seen in FIGS. 2 and 3, upper low-friction pads 34 and lower low-friction pads 36 are shaped and mounted on blade 20 such that a fan action is provided as the blade rotates in the direction of arrow 44. More specifically, elongated pads 34 and 36 are positioned on substantially circular blade 20 such that the leading edge 33 in the direction of rotation of pad 34 is radially closer to the center of blade 20 than the trailing edge 35. The same arrangement applies to the lower pads 36, that is that the leading edge is inward radially and the lagging edge, in the direction of rotation, is positioned at a radial distance greater from the center of blade 20. As blade 20 rotates in the direction of arrow 44, air is drawn in through air intake ports 24 in upper portion 26 of the circular housing and is forced outwardly in the directions of arrows 46 and 48.

As may be best seen in FIGS. 2 and 3, substantially circular blade 20 is provided with a plurality of cutting elements 50. Any suitable number of cutting elements may be utilized. However, in a presently preferred embodiment, three cutting elements 50 are provided on the circular blade, formed approximately 120 degrees apart. The cutting elements 50 are generally in the shape of a U-shaped element. Sharpened portions of the U-shaped elements 52 are formed in the direction of rotation of the blade. As described herein, blade 20 is substantially circular. As illustrated in FIG. 3 in dotted lines at 54, straight sections of support may be utilized between adjacent radial members 56 and 58 on which cutting elements 50 are mounted. In other words, as illustrated in the various drawings, there are substantially circular arcuate portions 60 connecting the outer portions of radial arms. However, in order to reduce the weight of the blade, these arcuate sections 60 may be replaced by chords of the circle or straight segments between the outer portions of the radial arms thereby decreasing the length and decreasing the weight of the blade. The three straight segments would produce a substantially equilateral triangular shape, which is considered to be substantially circular. As indicated above, various other arrangements such as square, hexagon, octagon or the like may be utilized, all being considered to be substantially circular. The present invention is preferably designed as an ergonomic apparatus, and minimizing weight is advantageous.

Substantially circular blade 20 may be driven by motor 62 preferably mounted in a distal or remote portion of handle 14. This provides the advantage of balancing the weight between the handle portion and the substantially circular housing 12. The person using the hedge trimmer would normally grasp the hedge trimmer in the area 64 of handle 14. In this manner, the weight of the motor 62 would be behind the person's hand and the substantially circular portion 12 of the housing containing the rotating blade would be beyond the person's hand. In this manner, the weight of hedge trimmer 10 is balanced and easier to handle. This is particularly so in contrast to elongated hedge trimmers which extend for substantial distances in one direction from the person's hand, typically 20 to 24 inches with much of the weight being in the elongated cutting element extending far from the operator's hand. However, it is understood that the motor may be more proximally located, that is more towards substantially circular housing 12, within the spirit of practicing the present invention.

Continuing to refer to FIG. 3, there is shown arrows 66 and 68 which indicate the direction of movement of hedge trimmer 10 when moved forwardly and backwardly by the operator. Although digits 32 may be radially arranged within the scope of the present invention, in a presently preferred embodiment, as may be seen, digits 32 (as well as digits 30 and 18) are not formed in a radial direction with respect to substantially circular housing 12. The digits are formed at an angle such that they lay on the arc of movement (directions of arrows 66 and 68) forwardly and backwardly for a typical person holding handle 14 in the area of 64 as shown on FIG. 3. The arc along the path of arrows 66 and 68 being formed by the path of rotational movement of the distal end of an approximate radial length extending substantially from the elbow of a typical person to substantially the center of blade 20. This radial length to form the arc may vary somewhat. In this manner, as the person naturally holds hedge trimmer 10 and swings it in an arc forwardly and rearwardly (sideways movement as viewed by the user), the hedge stems naturally enter into the spaces between digits 18 (as well as 30 and 32) and are cut by cutting elements 50 on rotating blade 20.

Referring to FIG. 4, motor 62 drives blade 20 via drive shaft 22. Motor 62 is provided with a motor operating switch 63 for conveniently turning motor 62 on and off. Switch 63 is preferably a pressure-on switch for safer operation. In other words, preferably switch 63 needs to be held on by pressure and removal or release of the pressure on the switch automatically shuts off motor 62. However, it is understood that various types of switches may be utilized in practicing the present invention. Switch 63 is connected to motor 62 via wires 65. For ease of assembly and disassembly, drive shaft 22 may be provided with a coupling 70. However, coupling 70 is not deemed to be essential. This may preferably be a splined coupling. An extended portion of drive shaft 22 may be journaled in the housing at 69 and 71. However, it is understood that other structural arrangements of driving blade 20 may be utilized.

A worm gear 72 is mounted near the distal or far end of drive shaft 22. As may be best seen in FIGS. 2, 3 and 5, worm gear 72 drives gear 74 which is mounted about shaft 76. The drive shaft or axle of worm gear 72 is journaled in mounts 69 and 71.

Referring now to all drawings, and particularly FIGS. 7 through 9, there is shown an enlarged view of gear 74 mounted on shaft 76. As may be best seen in FIGS. 7 through 9, a clutch arrangement connects drive gear 74 with blade drive member 82. The lower and upper parts of the clutch, clutch members 78 and 80, have mating rounded teeth which have been shown to engage and release predictably and smoothly where mechanical stress demands. Such mechanical stress may be created in this case if the blade 20 is stalled, for example, by hitting a steel cable or the like during use. Blade drive member 82 is preferably provided with a substantially triangular shaped portion 84. Triangular shaped portion 84 mates with triangular center section 92 of blade 20 as may be best seen in FIG. 2. However, it is understood that any suitable shape may be utilized for member 82 and the center of blade 20. This may be square, rectangular, toothed, multi sided such as pentagon, hexagon, octagon or any other non-circular or irregular shape which would allow the blade to be easily mounted on and removed from the drive member but which would prevent rotation between the drive member and the blade. Preferably, the triangular shaped portion 84 of blade drive member 82 is slightly tapered at 85 as may be best seen in FIGS. 8 and 9 such that its upper end is slightly larger than its lower end. This ensures that blade drive member 82 will be able to easily move upwardly against resilient member or spring 86 should blade 20 be stalled by, for example, engaging a steel cable, thereby allowing blade drive member 82 to move upwardly in the direction of arrow 88 as shown in FIG. 9, allowing disengagement of the clutch comprised on clutch members 78 and 80. In other words, blade 20 is effectively decoupled from motor 62. The taper on triangular shaped portion 84 insures that there will be no sticking or binding between portion 92 of blade 20 and triangular portion 84 of drive member 82 when blade drive member 82 attempts to move in the direction of arrow 88. It is understood that other types of springs or resilient members may be used in place of spring 86 and various other shapes of interdigitation or clutch-like elements may be utilized in place of clutch members 78 and 80 within the spirit of the present invention.

Continuing to refer to all of the figures, particularly FIGS. 8 and 9, shaft 76 is mounted in lower portion of substantially circular housing 12 by passing through lower portion 28 and being provided with a flange 90. However, it is understood that various other means of mounting a shaft to lower portion 28 of substantially circular housing 12 may be used. Gear 74 driven by worm gear 72 is mounted on shaft 76, as well as blade drive member 82. Blade 20, and particularly triangular portion 92 of blade 20 is mounted on shaft 76. Resilient spring member 86 is also mounted over shaft 76. Resilient spring member 86 is engaged between blade drive member 82 and the upper portion 26 of substantially circular housing 12 as may be best seen in FIGS. 2, 4 and 5. Resilient spring member 86 normally holds blade drive member 82 in engagement with clutch-like member 78 formed on gear 74. In this manner, blade 20 mounted on blade drive member 82 rotates in response to rotation of gear 74 by worm gear 72 mounted on drive shaft 22 which is driven by motor 62. This condition is illustrated in various of the drawings including FIG. 8. However, should blade 20 be stalled, such as by hitting a steel cable or the like, during operation of motor 62, sufficient force is generated such that the rounded clutch-like members 78 and 80 would disengage or slip as a result of blade drive member 82 moving upwardly in the direction of arrow 88 against the force of resilient member or spring member 86, causing a ratcheting sound to alert the operator who would release power switch 63 and prevent damage to the blade, gearing, motor and other components. As illustrated, spring 86 may be mounted between washers 94 and 96.

The substantially circular hedge trimmer of the present invention is provided with latching structure which enables quick and easy removal of the blade for sharpening, repair, replacement or the like. Further, this latching structure is such that it securely retains the housing in a locked condition preventing any possibility of inadvertent disassembly during use.

Referring to all of the figures, but more particularly to FIGS. 2, 5 and 6, there is shown an opening 98 in shaft 76 near its upper end. Further comprising this latching means, for securing upper portion 26 of substantially circular housing 12, along with spring 86, blade drive member 82 and related structure, is a pair of hook shaped members 100 and 102. Hook shaped members 100 and 102 are pivotally mounted to upper portion 26 of the substantially circular housing 12 by means of pivot members which may be screws, rivets or other pivot structure 104 and 106, respectively. Hook shaped members are repositionable within opening 98 of shaft 76 to lock upper portion 26 of the housing in place. Hook shaped members are retained in position, within opening 98, by means of spring loaded detent balls 108 and 110, respectively. This latching means is provided with a latch cover 112. Latch cover 112 may snap into position. When latch cover 112 is in place, it further prevents any possible removal of hook shaped members 100 and 102 from opening 98.

Figure 10:
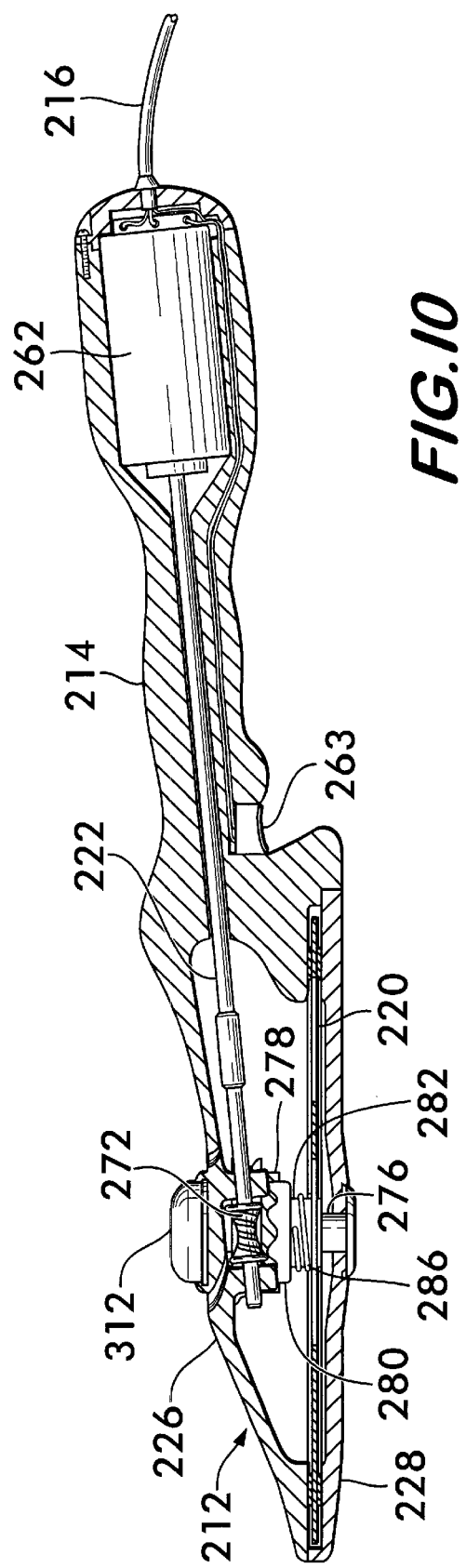
FIG. 10 is a cross sectional view of another preferred embodiment of the present invention, similar to the cross sectional view of FIG. 4, wherein the drive shaft and related drive structure are mounted above the substantially circular blade, with the blade being arranged lower in the housing.

Referring now to FIG. 10, there is shown a presently preferred embodiment of the invention wherein the substantially circular planar blade is mounted close to the bottom of the substantially circular housing thereby allowing the cutting to be somewhat closer to the stiffer portion of a hedge or other plant life. The structure illustrated in FIG. 10 is substantially similar to the other embodiments but the structural components are rearranged to make it feasible within the spirit of the present invention to lower the position of the blade within the housing for possibly improving trimming functions such as being able to cut closer to stiffer hedge components. The cross sectional view illustrated in FIG. 10 is similar to and taken along the same cross section line as FIG. 4. The main difference with respect to FIG. 10 is that the substantially circular blade 220 is arranged such that it is the lowest moving component in substantially circular housing 212. This is arranged at least in part by having drive shaft 222 and its associated drive means including worm gear 272, clutch or release means 278 and 280, blade drive member 282 and resilient member or spring 286 located above substantially circular blade 220.

Referring to FIG. 10, there is shown the substantially circular housing 212 comprised of an upper portion 226 and a lower portion 228. In FIG. 10, the upper portion 226 of substantially circular housing 312 is integrally formed with or permanently physically connected to handle 214, and lower portion 229 of said substantially circular housing 312 is removable with shaft 276. This is in contrast to the other embodiment wherein the handle was integrally formed to or permanently connected to the lower portion of substantially circular housing.

Continuing to refer to FIG. 10, handle 214 is provided with motor 262 which is supplied with power through power cord 216 and switch 263. As discussed above, switch 263 may preferably be a pressure-on switch, but other suitable switches may be utilized. Also, as discussed with respect to the other embodiments, preferably motor 262 is located in a distal portion of handle 214 as illustrated in FIG. 10, but it may be located at any location along the handle length. The handle 214, and handle 14 of the other embodiment, although preferably offset from the plane of substantially circular planar blade by approximately six degrees may not be offset at all or may be offset anywhere from approximately three degrees to eight degrees.

Although rearranged somewhat in reverse order of the other embodiment, the structure is similar in that a worm gear 272 mounted on an extension of drive shaft 222 drives blade drive member 282 through a clutch or drive release mechanism comprised of clutch members 278 and 280. The clutch is held in the engaged position by resilient member or spring 286 unless significant stress or force is applied to stop blade 220 from rotating during use, at which time spring 286 would be compressed causing a ratcheting sound alerting the operator to release switch 263.

Disassembly would be similar to that illustrated with respect to the other embodiment wherein latch cover 312 would be removed, hook shaped members would be removed from the opening in the shaft 276, and shaft 276 along with lower portion 228 of substantially circular housing would be removed downwardly as viewed in FIG. 10.

The present invention may be embodied in other specific forms without departing from the spirit or essential attributes thereof and, accordingly, reference should be made to the appended claims, rather than to the foregoing specification as indicating the scope of the invention.

We claim:

1. An apparatus for trimming hedge, comprising:
   a substantially circular housing;
   a handle projecting from said housing;
   a substantially circular planar blade having a plurality of cutting elements thereon, said blade being mounted within said substantially circular housing and adapted to rotate;
   a motor mounted in said handle for rotating said circular blade;
   said substantially circular housing being provided with a plurality of digits between which hedge can be received wherein said cutting elements on said rotating circular blade can cut said hedge;
   including a first and a second set of said plurality of digits between which hedge can be received, said first set being on one side of said handle and said second set being on the opposite side of said handle; and
   wherein said substantially circular blade is mounted between an upper and a lower portion of said substantially circular housing using low-friction pads mounted to said blade, said pads riding against said upper and lower portions of said circular housing.

2. An apparatus in accordance with claim 1 wherein said pads are constructed of nylon.

3. An apparatus in accordance with claim 1 wherein said pads are constructed of teflon.

4. An apparatus in accordance with claim 1 wherein said pads are elongated and positioned on said substantially circular blade to create a fan action for blowing air outwardly from said substantially circular housing.

5. An apparatus in accordance with claim 4 wherein said substantially circular housing is provided with centrally located air input ports.

6. An apparatus for trimming hedge, comprising:
   a substantially circular housing;
   a handle projecting from said housing;
   a substantially circular planar blade having a plurality of cutting elements thereon, said blade being mounted within said substantially circular housing and adapted to rotate;
   a motor mounted in said handle for rotating said circular blade;
   said substantially circular housing being provided with a plurality of digits between which hedge can be received wherein said cutting elements on said rotating circular blade can cut said hedge;
   including a first and a second set of said plurality of digits between which hedge can be received, said first set being on one side of said handle and said second set being on the opposite side of said handle; and
   wherein said handle projects substantially in a radial direction with respect to said circular housing and is offset from a plane of said substantially circular planar blade by approximately six degrees.

7. An apparatus for trimming hedge, comprising:
   a substantially circular housing;
   a handle projecting from said housing;
   a substantially circular planar blade having a plurality of cutting elements thereon, said blade being mounted within said substantially circular housing and adapted to rotate;
   a motor mounted in said handle for rotating said circular blade;
   said substantially circular housing being provided with a plurality of digits between which hedge can be received wherein said cutting elements on said rotating circular blade can cut said hedge;
   including a first and a second set of said plurality of digits between which hedge can be received, said first set being on one side of said handle and said second set being on the opposite side of said handle; and
   wherein said handle projects substantially in a radial direction with respect to said circular housing and is offset from a plane of said substantially circular planar blade by a predetermined number of degrees in the range of three to eight.

8. An apparatus for trimming hedge, comprising:
   a substantially circular housing;
   a handle projecting from said housing;
   a substantially circular planar blade having a plurality of cutting elements thereon, said blade being mounted within said substantially circular housing and adapted to rotate;
   a motor mounted in said handle for rotating said circular blade;
   said substantially circular housing being provided with a plurality of digits between which hedge can be received wherein said cutting elements on said rotating circular blade can cut said hedge;
   including a first and a second set of said plurality of digits between which hedge can be received, said first set being on one side of said handle and said second set being on the opposite side of said handle; and
   wherein said substantially circular blade is provided with three cutting elements mounted equally distant around the periphery of said substantially circular blade.

9. An apparatus in accordance with claim 8 including a drive shaft means connected between said motor and said substantially circular blade.

10. An apparatus in accordance with claim 9 wherein said handle is mounted substantially radially to said circular housing and said motor is mounted in a distal portion of said handle.

11. An apparatus in accordance with claim 10 wherein said drive shaft means is located above said substantially circular blade.

12. An apparatus in accordance with claim 10 wherein said drive shaft means is located below said substantially circular blade.

13. An apparatus in accordance with claim 9 wherein said drive shaft means is located above said substantially circular blade.

14. An apparatus in accordance with claim 9 wherein said drive shaft means is located below said substantially circular blade.

15. An apparatus in accordance with claim 8 wherein said plurality of digits are directed in the direction of an arc corresponding to the direction of movement of the apparatus when swung forwardly and rearwardly by an arm of a user.

16. An apparatus in accordance with claim 15 wherein said plurality of digits are spaced to prevent a body part of the user from contacting said substantially circular blade.

17. An apparatus in accordance with claim 15 wherein said plurality of digits have a width of approximately ⅛th of an inch.

18. An apparatus in accordance with claim 15 wherein said plurality of digits are spaced to provide approximately a ¼ inch opening between digits.

19. An apparatus in accordance with claim 8 wherein said plurality of digits are spaced to prevent a body part of the user from contacting said substantially circular blade.

20. An apparatus in accordance with claim 8 wherein said plurality of digits have a width of approximately ⅛th of an inch.

21. An apparatus in accordance with claim 8 wherein said plurality of digits are spaced to provide approximately a ¼ inch opening between digits.

22. An apparatus in accordance with claim 8 wherein said substantially circular blade is mounted in said substantially circular housing such that said substantially circular blade is substantially the lowest moving component in said substantially circular housing.

23. An apparatus in accordance with claim 8 wherein said motor is provided with a switch which requires pressure to be maintained thereon to enable operation of said motor.

24. An apparatus in accordance with claim 8 wherein said substantial circular housing and said handle are integrally formed from plastic.

25. An apparatus in accordance with claim 8 including a release mechanism for releasing said substantially circular blade from said motor to prevent damage should said blade be stopped when said motor is operating.

26. An apparatus in accordance with claim 8 wherein said blade is driven by a pair of clutch members held in engagement by a resilient force, whereby said clutch members can be disengaged by compressing said resilient force.

27. An apparatus in accordance with claim 8 wherein each of said cutting elements are in the shape of a U-shaped element.

28. An apparatus in accordance with claim 27 wherein the diameter of the blade immediately following each cutting element reduces by at least the width of the cutting element to enable hedge to rapidly enter between the digits as soon as the cutting element passes, positioning such hedge for the next cutting element.

29. An apparatus in accordance with claim 27 wherein said U-shaped cutting elements have a sharpened portion in the direction of rotation of said blade.

30. An apparatus in accordance with claim 8 wherein said substantially circular blade is provided with substantially straight sections between adjacent cutting elements on the periphery of the blade to reduce blade weight.

31. An apparatus in accordance with claim 8 wherein said substantially circular housing is comprised of a lower section and an upper section, said lower section having mounted thereto a shaft which forms the axis of said substantially circular blade, said upper section of said housing being secured to and releasable from said lower section of said housing by a latch means secured to said upper section and passing through an opening in said shaft.

32. An apparatus in accordance with claim 31 wherein said latch means is comprised of a pair of hook members passing through said opening in said shaft from opposite directions and retained therein by a detent mechanism.

33. An apparatus in accordance with claim 32 wherein said latch means is provided with a latch cover which further prevents said hook members from coming out of said shaft opening when said latch cover is in place on said upper section of said housing.

\* \* \* \* \*